(12) United States Patent
Kim et al.

(10) Patent No.: US 8,907,613 B2
(45) Date of Patent: Dec. 9, 2014

(54) SYSTEM AND METHOD FOR CONTROLLING MOTOR OF ELECTRIC VEHICLE

(75) Inventors: Sung Kyu Kim, Gyeonggi-do (KR); Wonkyoung Choi, Gyeonggi-do (KR); Mu Shin Kwak, Gyeonggi-do (KR); Suhyun Bae, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 147 days.

(21) Appl. No.: 13/571,597

(22) Filed: Aug. 10, 2012

(65) Prior Publication Data

US 2013/0147417 A1    Jun. 13, 2013

(30) Foreign Application Priority Data

Dec. 7, 2011    (KR) .................. 10-2011-0130550

(51) Int. Cl.
*H02P 1/46*    (2006.01)

(52) U.S. Cl.
USPC ..................... 318/722; 318/400.02; 318/139

(58) Field of Classification Search
USPC ............. 318/722, 400.02, 139, 376, 800, 432
See application file for complete search history.

(56) References Cited

U.S. PATENT DOCUMENTS

2002/0190672 A1* 12/2002 Karikomi ...................... 318/139
2013/0141953 A1*  6/2013 Nakamura et al. ............. 363/74

FOREIGN PATENT DOCUMENTS

| JP | 08098600 A | 4/1996 |
| JP | 2000166009 A | 6/2000 |
| JP | 2007202384 A | 8/2007 |
| KR | 10-0456850 | 11/2004 |
| KR | 1020080030226 A | 4/2008 |
| KR | 10-0957330 | 5/2010 |

* cited by examiner

*Primary Examiner* — Karen Masih
(74) *Attorney, Agent, or Firm* — Edwards Wildman Palmer LLP; Peter F. Corless (57) ABSTRACT

Disclosed are a system and a method for controlling a motor of an electric vehicle. In particular, an output voltage from a battery used to provide power to a motor of an electric vehicle, a speed and a torque of the motor are used to generate a magnetic flux based current control map. A current control command is then generated using the magnetic flux based current control map.

13 Claims, 6 Drawing Sheets

PRIOR ART

SYSTEM AND METHOD FOR CONTROLLING MOTOR OF ELECTRIC VEHICLE

CROSS-REFERENCE TO RELATED APPLICATION

This application claims priority to and the benefit of Korean Patent Application No. 10-2011-0130550 filed in the Korean Intellectual Property Office on Dec. 7, 2011, the entire contents of which are incorporated herein by reference.

BACKGROUND OF THE INVENTION (a) Field of the Invention

The present invention relates to a system and method for controlling a motor of an electric vehicle. More particularly, the present invention relates to a system and method for controlling a motor of an electric vehicle such as hybrid vehicle effectively and reliably.

(b) Description of the Related Art

Electric vehicle are typically driven by power from a battery. Electric vehicles may be either a pure electric vehicle using power from the battery only, to a hybrid vehicle using power from the battery and power from an internal combustion engine in combination.

One type of eclectic motor for an electric vehicle is an interior permanent magnet synchronous machine (IPMSM) which is typically capable of outputting high torque and efficiency per unit volume. In many cases, a velocity based current control map which is constructed by experimental a battery output voltage (inverter input voltage) conditions is applied for controlling a torque of the IPMSM.

A plurality of experimental data associated with velocity and torque control commands typically must be obtained to construct the velocity based current control map, however. Thus, unfortunately, it takes a relatively long time to develop the velocity based current control map.

Further, if a voltage of a battery of a vehicle is less than a reference voltage of the current control map then it becomes unstable during current control because of lack of voltage, and if a voltage of a battery is greater than the reference voltage of the current control map then it becomes impossible to maximize an efficiency of a system and an additional algorithm is required for improving efficiency of a system.

Figure 6:
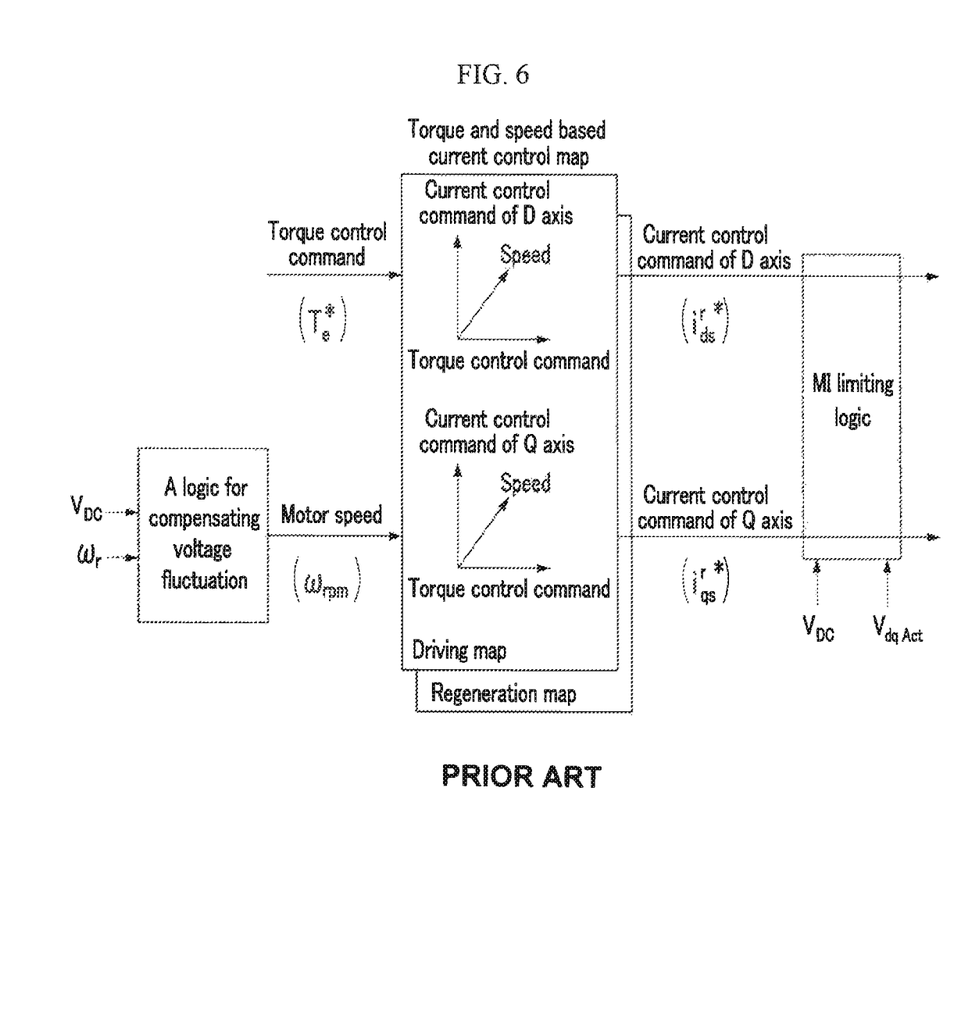
FIG. 6 is a schematic view of a system and method for controlling a motor according to a conventional art.

FIG. 6 is a schematic view of a velocity based current control command decision method according to a conventional art. A three-phase alternating current motor receives variables such as a voltage and a current having three phases, and converts the three phase variables to variables of a rectangular coordinate system having a d, q, and 0 axis. This coordinate conversion is generally used for modeling or analyzing an alternating current (AC) machine.

As shown in FIG. 6, a velocity based current control method according to a conventional art uses a predetermined table that determines a d axis current control command ($i^r_{ds}{}^*$) and q axis current control command ($i^r_{qs}{}^*$) corresponding to a torque control command and a motor speed. This conventional method is able to stably control the torque. However, it requires an additional algorithm to do so. Since the conventional method receives only the torque control command and the motor speed for generating current control command, it is difficult to respond to a voltage fluctuation of a battery and to effectively operate a motor system without the additional algorithm. Therefore, the conventional method requires an additional algorithm such as voltage utilization ratio limiting logic when the output voltage of the battery is deficient, and a voltage fluctuation compensating logic when surplus output voltage is produced.

Further, the conventional method has to retain a sweep date in all motor speeds for generating current control command, and a control stability conflicts with output improvement. Thus, in short, the conventional velocity based current control method has an additional logic for compensating the voltage fluctuation of the battery, and restrictively reflecting the voltage fluctuation of the battery Additionally, the conventional method is an off-line control method and an indirect control method changing a motor speed value in current control map when a voltage of battery fluctuates. Therefore it is difficult to reflect an actual voltage fluctuation since the conventional method cannot reflect the current vehicle conditions in real time.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a system and method for controlling a motor of an electric vehicle having advantages of maintaining control stability even when a voltage of a battery fluctuates, improving control accuracy by overcoming a limitation produced by errors of a motor, and improving fuel efficiency and power performance by applying to an electric vehicle such as hybrid vehicle.

An exemplary embodiment of the present invention provides a system and method for controlling a motor of an electric vehicle which includes receiving an output voltage of a battery, a speed and a torque of the motor, the battery providing a driving power to the motor; generating a magnetic flux based current control map using the output voltage of the battery, the speed and the torque of the motor; and generating a current control command using the magnetic flux based current control map.

The system and method may further include generating a driving point ratio which is a ratio of the output voltage of the battery and the speed of the motor, and generating a torque control command by using the speed and torque of the motor. More specifically, the magnetic flux based current control map may be generated by using the driving point ratio and the torque control command. The method may further include generating a voltage control command from the current control command.

The output voltage ($V_{dc}$) of the battery, the speed ($\omega_r$) of the motor, and the driving point ratio ($1/\lambda_{max}$) may satisfy the equation:

$$\sqrt{\lambda_d^2 + \lambda_q^2} \le \frac{V_{dc}}{\sqrt{3}\,\omega_r} = \lambda_{max}$$

In particular, the $\lambda_d$ refers to a magnetic flux interlinkage of d axis and $\lambda_q$ refers to a magnetic flux interlinkage of q axis, and the $\lambda_{max}$ refers to a ratio of the $V_{dc}$ and the $\omega_r$. The system and method may also include receiving the voltage control command by feedback so as to reflect the voltage control command on generation of the driving point ratio ($1/\lambda_{max}$) by a voltage utilization ratio controller. The voltage utilization ratio controller may receive a feedback value ($V_{d,q\_ref}$) of the voltage control commands of d axis and q axis, and change the driving point ratio $(1/\lambda_{max})$ responsive thereto for making voltage utilization ratio is 1. Additionally, a phase voltage control command may be generated using the voltage control command.

According to an exemplary embodiment of the present invention, a current control map may be generated dynamically to reduce the amount of time required to generate the current control map, and a voltage fluctuation of the battery is reflected in the current control map so that control stability can be maintained even when a voltage of the battery fluctuates. Further, control accuracy can be improved controlling voltage utilization ratio that can overcome a limitation occurred by a distribution of motor parameters and errors.

DESCRIPTION OF SYMBOLS

10: Inverter (MCU)
100: HCU
200: BMS
300: TCU
400: Voltage utilization ratio controller
500: Current control portion
600: Proportional-Integral controller
700: Phase voltage control portion

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a server or a network. Additionally, although the exemplary embodiment is described as using one control unit to perform the above process, it is understood that the above processes may also be performed by a plurality of control units, controllers, processors or the like.

Figure 1:
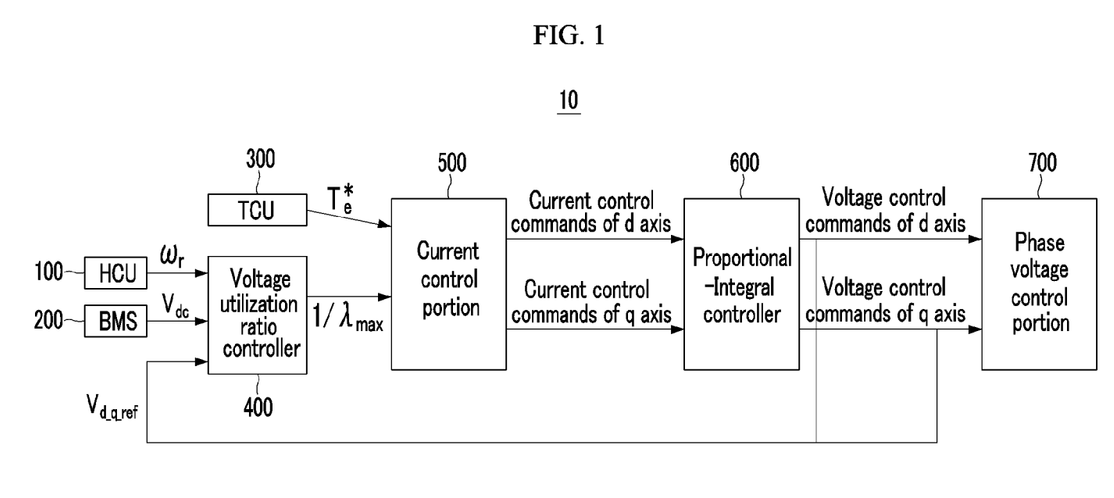
FIG. 1 is a schematic diagram of a system for controlling a motor of an electric vehicle according to an exemplary embodiment of the present invention.
Figure 2:
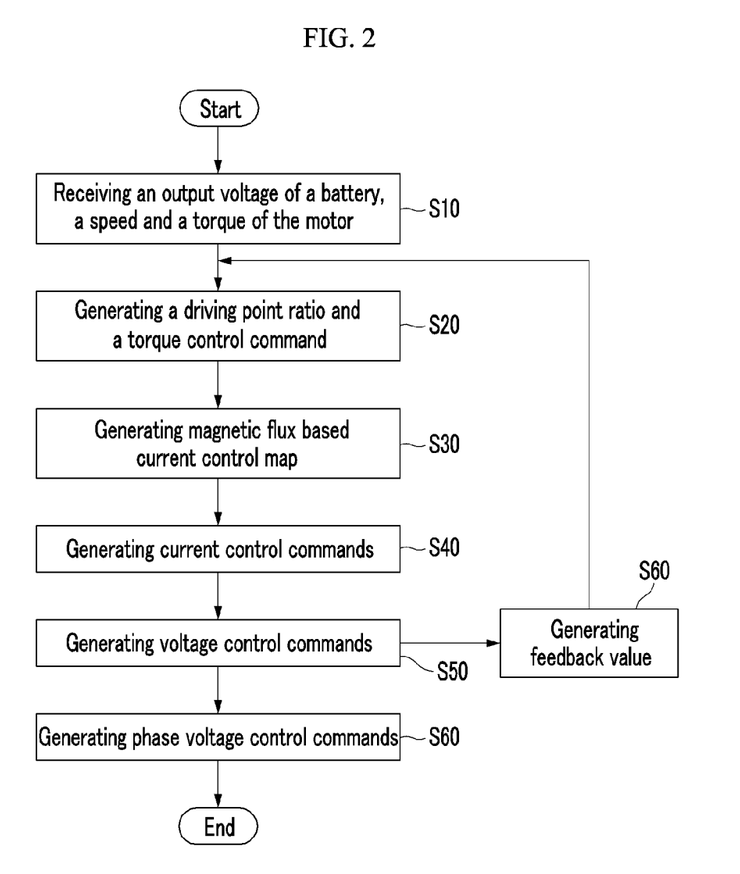
FIG. 2 is a flowchart of a method for controlling a motor of an electric vehicle according to an exemplary embodiment of the present invention.
Figure 3:
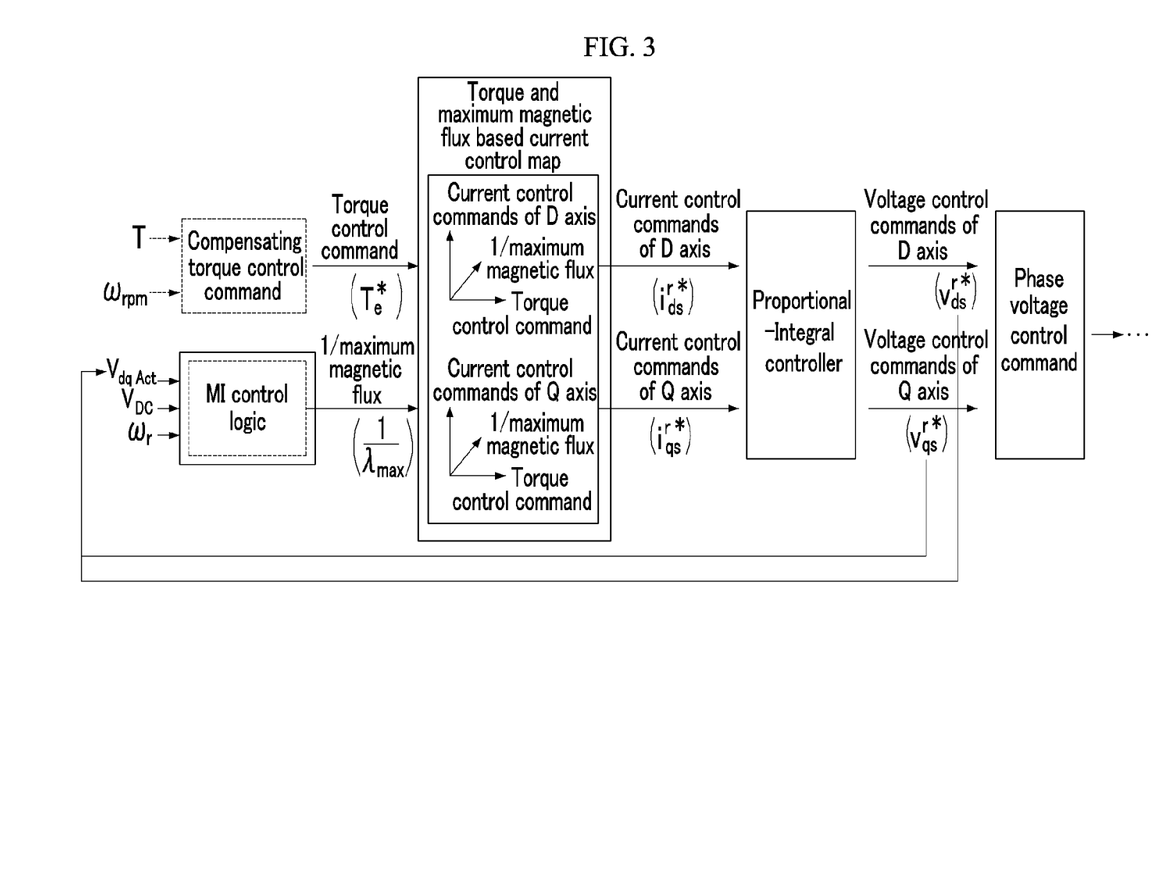
FIG. 3 is a schematic view of a system for controlling a motor of an electric vehicle according to an exemplary embodiment of the present invention.

FIG. 1 is a schematic diagram of a system for controlling a motor of an electric vehicle according to an exemplary embodiment of the present invention, FIG. 2 is a flowchart of a system and method for controlling a motor of an electric vehicle according to an exemplary embodiment of the present invention, and FIG. 3 is a schematic view of a system and method for controlling a motor of an electric vehicle according to an exemplary embodiment of the present invention.

As shown in FIG. 1 to FIG. 3, a system and method for controlling a motor of an electric vehicle according to an exemplary embodiment of the present invention may include receiving an output voltage from a battery providing driving power to the motor, a speed and a torque of the motor at a control unit at step S10; generating a driving point ratio $(1/\lambda_{max})$ which is a ratio of the output voltage of the battery and the speed of the motor, and generating a torque control command $(T^*_e)$ by using the speed and torque of the motor at step S20; generating a magnetic flux based current control map using the output voltage of the battery, the speed and the torque of the motor received at the controller at step S30; generating a current control command using the magnetic flux based current control map at step S40; generating a voltage control command from the current control command at step S50; generating a phase voltage control command using the voltage control command at step S60; and, receiving the voltage control command by feedback to reflect the voltage control command on generation of the driving point ratio $(1/\lambda_{max})$ by a voltage utilization ratio controller at step S70.

A system for controlling a motor of an electric vehicle according to an exemplary embodiment of the present invention may include an inverter 10, at least one control unit (e.g., 100), a battery, and a motor. The battery supplies an operating power to the motor as a main power source. The inverter 10 generally includes a plurality of insulated gate bipolar transistor (IGBT) switch elements, and supplies a driving power of motor produced by switching direct current (DC) voltage provided from the battery to a phase voltage by a pulse width modulation (PWM) signal.

The inverter plays a role of motor control unit (MCU) 10 and controls the motor by outputting a pulse width modulation PWM signal according to a motor driving control signal provided from the hybrid control unit (HCU) 100, a battery condition information provided from the battery management system (BMS) 200, and a motor torque control signal provided from torque control unit (TCU) 300.

At step S10, as shown in FIG. 2 to FIG. 3 the method for controlling a motor of an electric vehicle according to an exemplary embodiment of the present invention a voltage utilization ratio controller 400 receives a speed $(\omega_r)$ and torque (T) of the motor, and a battery output voltage $(V_{dc})$ for providing motor driving power. And at step S20, the torque control unit 300 generates a torque control command $(T^*_e)$ from the receiving speed $(\omega_r)$ and torque (T) of the motor. The voltage utilization ratio controller 400 then generates a driving point ratio from the battery output voltage and the speed $(\omega_r)$ of the motor. The driving point ratio refers to a reciprocal of maximum magnetic flux so that the present invention controls a current based on the magnetic flux.

At step S30, a current control portion 500 generates a magnetic flux based current control map using the torque control command ($T^*_e$) and the driving point ratio ($1/\lambda_{max}$). Notably, in conventional methods a current control map is generated with only two variables (i.e., motor speed and torque), but the present invention generates a current control map by receiving three variables (i.e., the speed ($\omega_r$) and torque (T) of motor, and the battery output voltage ($V_{dc}$) from the current control unit 500).

The battery output voltage ($V_{dc}$) and the motor speed ($\omega_r$) and the driving position ratio ($1/\lambda_{max}$) may have a relationship of the Equation 1 mentioned below.

$$\sqrt{\lambda_d^2 + \lambda_q^2} \leq \frac{V_{dc}}{\sqrt{3}\,\omega_r} = \lambda_{max} \quad \text{(Equation 1)}$$

In Equation 1, the $\lambda_d$ refers to a magnetic flux interlinkage of d axis, and the $\lambda_q$ refers to a magnetic flux interlinkage of q axis, and the $\lambda_{max}$ refers to a maximum magnetic flux as a ratio of the $V_{dc}$ and the $\omega_r$. The left side of Equation 1 may be defined as a $\lambda_{mag}$ (i.e., the size of the magnetic flux interlinkage inside of the motor).

Equation 1 may be derived from Equation 2 and Equation 3 mentioned below.

$$V_d = R_s i_d + \frac{d\lambda_d}{dt} - \omega_r \lambda_q \quad \text{(Equation 2)}$$
$$V_q = R_s i_q + \frac{d\lambda_q}{dt} + \omega_r \lambda_d$$

$$V_d = -\omega_r \lambda_q \quad \text{(Equation 3)}$$
$$V_q = \omega_r \lambda_d$$

In Equation 2 and Equation 3, the $V_d$ and $V_q$ refers to voltage of d axis and q axis respectively, and the $i_d$ and $i_q$ refers to a current of d axis and q axis, respectively. $R_s$ refers to a phase resistance of the stator of motor, the $\lambda_d$ and $\lambda_q$ refers to a magnetic interlinkage of d axis and q axis. The $\omega_r$ refers to an angular speed of motor and the $V_{dc}$ refers to the output voltage of the battery. The $\lambda_d$, $\lambda_d$ may be expressed as $\lambda_d = L_d i_d + \lambda_{PM}$, and $\lambda_q = L_q i_q$. The $L_d$ is an inductance of d axis and the $L_q$ is an inductance of q axis. The $\lambda_{PM}$ is a size of magnetic flux of a permanent magnet.

When a phase resistance and a current change rate in normal state are negligible in Equation 2 then Equation 2 becomes Equation 3, and Equation 1 can be derived by using Equation 3.

In some exemplary embodiments the magnetic flux based current control map can be produced by using the relationship between a range of currents $i_d$ and $i_q$ which satisfies the Equation 1 and a torque. Also, the voltage and the torque of d axis and q axis may be detected respectively while maintaining the speed of the motor to be constant. Additionally, the torque of a driving point and a driving point ratio ($1/\lambda_{max}$) can be derived by using the above detected data Further the current control portion 500 may derive a range of $i_d$ and $i_q$ which satisfies Equation 1 according to each driving point ratio ($1/\lambda_{max}$) by using a map extracting tool, and use $i_d$ and $i_q$ which have a minimum current size of all of $i_d$ and $i_q$ that meet with each torque line as a table value of a map generating a current control command. A magnetic flux based current control map can be produced automatically/dynamically by deriving a map through the above mentioned processes.

At step S40, the current control portion 500 generates a current control commands using the magnetic flux based current control map. As shown in FIG. 3, The current control command can be divided into a current control command ($i^{r*}_{ds}$) of D axis and a current control command ($i^{r*}_{qs}$) of Q axis. As a result the output voltage of the battery is considered in the current control map that the torque can be controlled by reflecting the vehicle state in real time, and an optimal current control command can be produced.

At step S50, a voltage control command ($v^{r*}_{ds}$) of D axis and a voltage control command ($v^{r*}_{qs}$) of Q axis are produced from the current control command ($i^{r*}_{ds}$) of D axis and a current control command ($i^{r*}_{qs}$) of Q axis through the Proportional-Integral (PI) controller 600. As shown in FIG. 3, the voltage control command ($v^{r*}_{ds}$) of D axis and the voltage control command ($v^{r*}_{qs}$) of Q axis are transmitted to the voltage utilization ratio controller 400 by feedback.

At step S60, the voltage utilization ratio controller 400 receives a feedback value ($V_{d,q\_ref}$) from the voltage control command ($v^{r*}_{ds}$) of D axis and the voltage control command ($v^{r*}_{qs}$) of Q axis, and changes the driving point ratio ($1/\lambda_{max}$) responsive thereto for making voltage utilization ratio diverge to 1.

The feedback value ($V_{d,q\_ref}$) may be a value that reflects characteristics of the motor, e.g., power, size, type, etc, as well as the voltage control command of d and q axis. In addition, the voltage utilization ratio controller 400 receives the feedback value ($V_{d,q\_ref}$) reflecting the characteristic of the motor and can change the driving point ratio ($1/\lambda_{max}$) responsive thereto for making voltage utilization ratio diverge to 1 by a full closed loop control method. As a result, the present invention can stabilize current control since the voltage utilization ratio is for the most part always maintained at 1.

At step S70, as shown in FIG. 1 to FIG. 3, a phase voltage control portion 700 receives the voltage control command ($v^{r*}_{ds}$) of D axis and voltage control command ($v^{r*}_{cis}$) of Q axis, and generates a phase voltage control commands using the voltage control command of D axis and Q axis.

Figure 4:
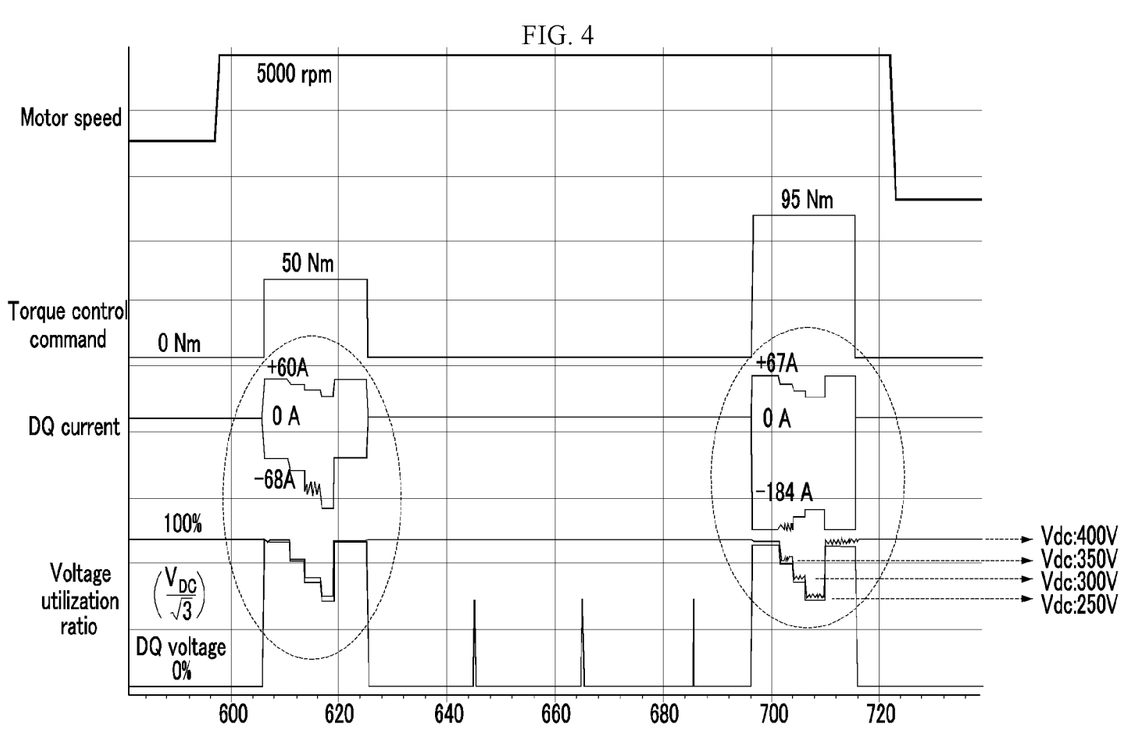
FIG. 4 is an experiment graph of a system and method for controlling a motor of an electric vehicle according to an exemplary embodiment of the present invention.
Figure 5:
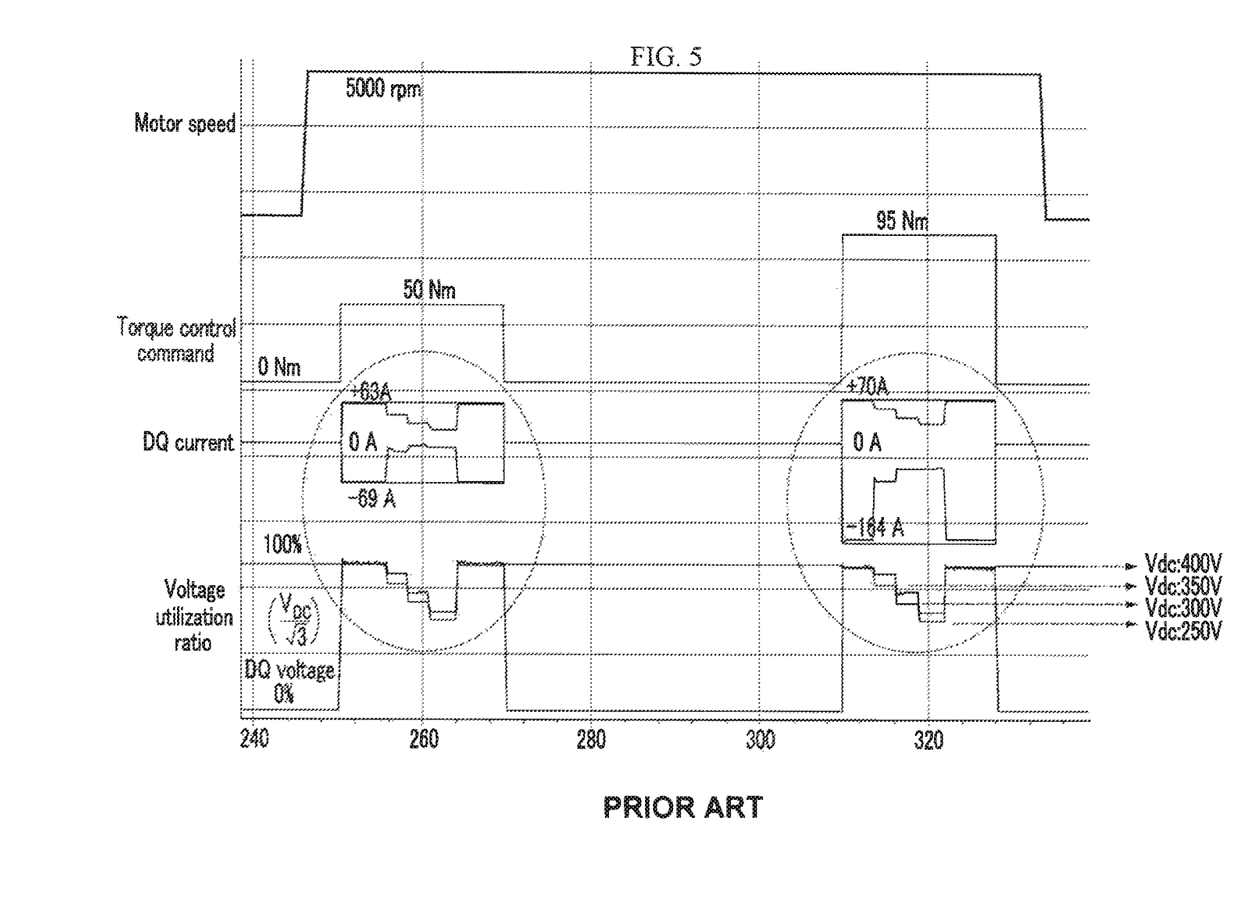
FIG. 5 is an experiment graph of a system and method for controlling a motor according to a conventional art.

FIG. 4 is an experiment graph of a method for controlling a motor of an electric vehicle according to an exemplary embodiment of the present invention, and FIG. 5 is an experiment graph of a method for controlling a motor according to a conventional art. As shown in FIG. 5, in the conventional art, the current control command has not changed although the output voltage ($V_{dc}$) of the battery has been changed. IN the conventional method, it is impossible to change the current control command in real time. Further the conventional art cannot maintain the voltage utilization ratio when the input voltage of inverter changes.

However, as shown in FIG. 4, in the case of the exemplary embodiment of the present invention, the driving point ratio ($1/\lambda_{max}$) that is an input value of the current control map and a ratio of $V_{dc}$ and $\omega_r$ changes when the output voltage ($V_{dc}$) of the battery changes. As a result, an optimal current control command can be produced or changed in real time by reflecting the change of the driving point ratio. Therefore the present invention can produce an optimal current control command at each driving point thereby improving the efficiency of the motor.

According to an exemplary embodiment of the present invention, a current control map is generated by an dynamically to reduce the amount of time required to generate the current control map, and a voltage fluctuation of the battery is reflected in the current control map to control stability and can be maintained even when a voltage of the battery changes. Further, the illustrative embodiment of the present invention improves control accuracy by controlling voltage utilization ratio to overcome a limitation caused by a distribution of motor parameters and errors.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for controlling a motor of an electric vehicle, comprising:
   receiving, by a control unit, an output voltage of a battery, a speed and a torque of the motor, the battery providing driving power to the motor;
   generating, by the control unit, a magnetic flux based current control map using the output voltage of the battery, the speed and the torque of the motor;
   generating, by the control unit, a current control command using the magnetic flux based current control map;
   generating a driving point ratio, the driving point ratio a ratio of the output voltage of the battery and the speed of the motor, and
   generating a torque control command by using the speed and torque of the motor, wherein the magnetic flux based current control map is generated by using the driving point ratio and the torque control command.

2. The method of claim 1, further comprising generating a voltage control command from the current control command.

3. The method of claim 2, wherein the output voltage, $V_{dc}$, of the battery, the speed, $\omega_r$, of the motor, and the driving point ratio, $1/\lambda_{max}$, satisfy the equation $$\sqrt{\lambda_d^2 + \lambda_q^2} \leq \frac{V_{dc}}{\sqrt{3}\,\omega_r} = \lambda_{max}$$

wherein, the $\lambda_d$ refers to a magnetic flux interlinkage of a d axis and $\lambda_q$ refers to a magnetic flux interlinkage of a q axis, and the $\lambda_{max}$ refers to a ratio of the $V_{dc}$ and the $\omega_r$.

4. The method of claim 2, further comprising receiving the voltage control command by feedback to reflect the voltage control command upon generation of the driving point ratio, $1/\lambda_{max}$, by a voltage utilization ratio controller.

5. The method of claim 4, wherein the voltage utilization ratio controller receives a feedback value, $V_{d,q\_ref}$, of the voltage control commands of the d axis and the q axis, and changes the driving point ratio $1/\lambda_{max}$, responsive thereto for making voltage utilization ratio be 1.

6. The method of claim 1, further comprising generating a phase voltage control command using the voltage control command.

7. A system for controlling a motor of an electric vehicle, comprising:
   a control unit configured to
      receive an output voltage of a battery, a speed and a torque of the motor, the battery providing driving power to the motor,
      generate a magnetic flux based current control map using the output voltage of the battery, the speed and the torque of the motor,
      generate a current control command using the magnetic flux based current control map,
      generate a driving point ratio, the driving point ratio a ratio of the output voltage of the battery and the speed of the motor, and
      generate a torque control command by using the speed and torque of the motor, wherein the magnetic flux based current control map is generated by using the driving point ratio and the torque control command.

8. The system of claim 7, wherein the control unit is further configured to generate a voltage control command from the current control command.

9. The system of claim 8, wherein the output voltage, $V_{dc}$, of the battery, the speed, $\omega_r$, of the motor, and the driving point ratio, $1/\lambda_{max}$, satisfy the equation $$\sqrt{\lambda_d^2 + \lambda_q^2} \leq \frac{V_{dc}}{\sqrt{3}\,\omega_r} = \lambda_{max}$$

wherein, the $\lambda_d$ refers to a magnetic flux interlinkage of a d axis and $\lambda_q$ refers to a magnetic flux interlinkage of a q axis, and the $\lambda_{max}$ refers to a ratio of the $V_{dc}$ and the $\omega_r$.

10. The system of claim 8, wherein the control unit is further configured to receive the voltage control command by feedback to reflect the voltage control command upon generation of t the driving point ratio, $1/\lambda_{max}$, by a voltage utilization ratio controller.

11. The system of claim 10, wherein the voltage utilization ratio controller receives a feedback value, $V_{d,q\_ref}$, of the voltage control commands of the d axis and the q axis, and changes the driving point ratio, $1/\lambda_{max}$, responsive thereto for making voltage utilization ratio be 1.

12. The system of claim 7, wherein the control unit is further configured to generate a phase voltage control command using the voltage control command.

13. A non-transitory computer readable medium containing program instructions executed by a processor or controller, the computer readable medium comprising:
   program instructions that utilize an output voltage of a battery, a speed and a torque of a motor of an electric vehicle to generate a magnetic flux based current control map;
   program instructions that generate a current control command using the magnetic flux based current control map generated;
   program instructions that generate a driving point ratio, the driving point ratio a ratio of the output voltage of the battery and the speed of the motor, and
   program instructions that generate a torque control command by using the speed and torque of the motor, wherein the magnetic flux based current control map is generated by using the driving point ratio and the torque control command.

* * * * *